United States Patent [19]

Takenaka et al.

[11] Patent Number: 5,177,797
[45] Date of Patent: Jan. 5, 1993

[54] BLOCK TRANSFORMATION CODING AND DECODING SYSTEM WITH OFFSET BLOCK DIVISION

[75] Inventors: Yuji Takenaka; Yoshitsugu Nishizawa, both of Kawasaki; Takahiro Hosokawa, Yokohama; Yuji Mori; Hideki Miyasaka, both of Kawasaki, all of Japan

[73] Assignee: Fujitsu Limited, Japan

[21] Appl. No.: 496,006

[22] Filed: Mar. 20, 1990

[30] Foreign Application Priority Data

Mar. 20, 1989 [JP] Japan .................................. 1-068813

[51] Int. Cl.$^5$ .......................... G06K 9/36; H04N 7/12
[52] U.S. Cl. ...................................... 382/56; 358/133; 358/426; 358/433
[58] Field of Search .................. 382/56; 358/133, 426, 358/433, 462

[56] References Cited

U.S. PATENT DOCUMENTS

| | | | |
|---|---|---|---|
| 4,598,411 | 7/1986 | Berkovich et al. | 358/426 |
| 4,706,126 | 11/1987 | Kondo | 358/426 |
| 4,768,082 | 8/1988 | Hiratsuka et al. | 358/426 |
| 4,797,944 | 1/1989 | Tanaka | 382/56 |
| 4,821,260 | 4/1989 | Klonk et al. | 381/2 |
| 4,918,524 | 4/1990 | Ansari et al. | 358/133 |

FOREIGN PATENT DOCUMENTS

| | | | |
|---|---|---|---|
| 63-197186 | 8/1988 | Japan | 358/433 |
| 63-246088 | 10/1988 | Japan | 358/435 |
| 1-140883 | 6/1989 | Japan | 358/433 |

Primary Examiner—David K. Moore
Assistant Examiner—Barry Stellrecht
Attorney, Agent, or Firm—Staas & Halsey

[57] ABSTRACT

An image data coding system, wherein an image data in a bit map form is divided into first and second groups, pixels in each group of which are distributed over the whole area of the image data in the bit map form. First and second coders respectively code the first and second groups of image data into first and second groups of coded image data. The first and second groups of image data in the original image data are respectively input into first and second memories, respectively. Blocks of the first group of image data are supplied to the first coder at first times, respectively, and blocks of the second group of image data are supplied to the second coder at second times, respectively. Boundaries of the blocks in the first group of image data are located in different positions from boundaries of the blocks in the second group of image data, and the first times are different from the second times. In the receiver side, first and second decoders respectively decode the above first and second groups of coded image data into first and second groups of decoded image data. By composing the first and second groups of decoded image data, the original image data in the bit map form is restored.

11 Claims, 8 Drawing Sheets

| Fig. 5A |
| Fig. 5B |

BLOCK TRANSFORMATION CODING AND DECODING SYSTEM WITH OFFSET BLOCK DIVISION

BACKGROUND OF THE INVENTION

1. Field of the Invention

The present invention relates to a block transformation coding system which is used in transmission of image data. The present invention relates to, in particular, a block transformation coding system which is used in transmission of image data having a wide band width.

2. Description of the Related Art

In transmission of image data, a block transformation coding system such as an orthogonal transformation coding system, is used to reduce the bit rate.

For example, in the orthogonal transformation coding system, a field of image data is divided into a plurality of blocks, image data in each block is transformed into frequency components, the transformed data is quantized in a quantizer, and is transmitted on a transmission line.

The bit rate after the block transformation before the quantizing, varies depending on the degrees of motion in the picture or variation of the image in each field. As the transmission rate in the transmission line has an upper limit, the bit rate transmitted on a transmission line is adaptively controlled based on the total amount of data which is to be transmitted, by changing a mode of the quantization in the quantizer.

In the above control of the quantization mode, a reduction of higher frequency components is often carried out. However, this reduction causes a deformation in a decoded image in a receiver side, e.g., a prominent blocklike pattern appears in the decoded image in the receiver side.

On the other hand, coding image data having a wide band width such as image data in a High Definition Television (HDTV) system, which requires a high processing speed, cannot be processed by one coder. Therefore, image data in a field is delivered to and developed in two groups, and the groups of image data are respectively coded in a plurality of coder, in parallel processing.

FIG. 1 shows an outline of FIGS. 1A and 1B illustrating an example of the above delivery to two groups and development therein of image data. In FIGS. 1A and 1B, L is a number of pixels in each line of the original image data. In the example of FIGS. 1A and 1B an original image is divided into a plurality of blocks each consisting of 8×4 pixels as shown in FIG. 1A, where pixels in each even-numbered line are divided into portions $(8m+1)$-th to $8(m+1)$-th pixels $(m=0-n$, and $8n$ is equal to the number L of the total pixels in each line), and pixels in each odd-numbered line are divided into portions $(8m+2)$-th to $[8(m+1)+1]$-th pixels. Each odd-numbered pixel in each even-numbered line and each even-numbered pixel in each odd-numbered line are developed in a field of the group 1, and each even-numbered pixel in each odd-numbered line and each odd-numbered pixel in each even-numbered line are developed in a field of the group 2.

The image data in the groups 1 and 2 is respectively coded in a plurality of block transformation coders and transmitted to a receiver side. A decoder in the receiver side decodes the transmitted data in the groups 1 and 2, respectively, and composes the decoded image data in the groups 1 and 2 to form the original image data in a manner inverse from FIGS. 1A and 1B.

However, in the conventional coding system wherein an original image data is developed on two groups, and is coded by a plurality of coders, as explained above, the dividing lines (boundaries) of the blocks are the same for the data in both the groups 1 and 2. Therefore, the aforementioned blocklike pattern is emphasized in the decoded image by the above parallel coding using two coders.

SUMMARY OF THE INVENTION

An object of the present invention is to provide an image data coding system wherein image data is coded and decoded at a high bit rate, and whereby a blocklike pattern is not emphasized in the decoded image.

According to a first aspect of the present invention, there is provided an image data coding system, comprising: first and second coders; a first group data holding means for holding a first group of image data; a second group data holding means for holding a second group of image data; an image data supplying means for supplying original image data; a first group data transferring means for selectively inputting the first group of image data in the original image data into the first group data holding means; a second group data inputting means for selectively inputting the second group of image data in the original image data into the second group data holding means; a first block supplying means for supplying blocks of the first group of image data to the first coder, at first times, respectively; and a second block supplying means for supplying blocks of the second group of image data to the second coder, at second times, respectively. The first and second coders respectively for coding the first and second groups of image data into first and second coded image data, by a block transformation coding. The first and second groups of image data are respectively distributed over a whole area of the original image data. Boundaries of the blocks in the first group of image data are located in different positions from boundaries of the blocks in the second group of image data, and the first times are different from the second times.

According to a second aspect of the present invention, there is provided an image data decoding system, comprising: first and second decoders respectively for decoding the first and second coded image data according to the first aspect of the present invention, into first and second groups of decoded image data; a decoded image data storing means for storing decoded image data in a bit map form; a first group data holding means for holding the first group of decoded image data; a second group data holding means for holding the second group of decoded image data; and an image data composing means for transferring the first group of decoded image data from the first group data holding means into the decoded image data storing means so that the original image data is restored.

BRIEF DESCRIPTION OF THE DRAWINGS

In the drawings:

FIGS. 1, 1A and 1B show an outline of an example of the above delivery to two groups and development therein of image data;

FIGS. 5, 5A and 5B show the locations of the above (boundaries of) the blocks in the embodiment of the present invention.

DESCRIPTION OF THE PREFERRED EMBODIMENTS

Figure 2:
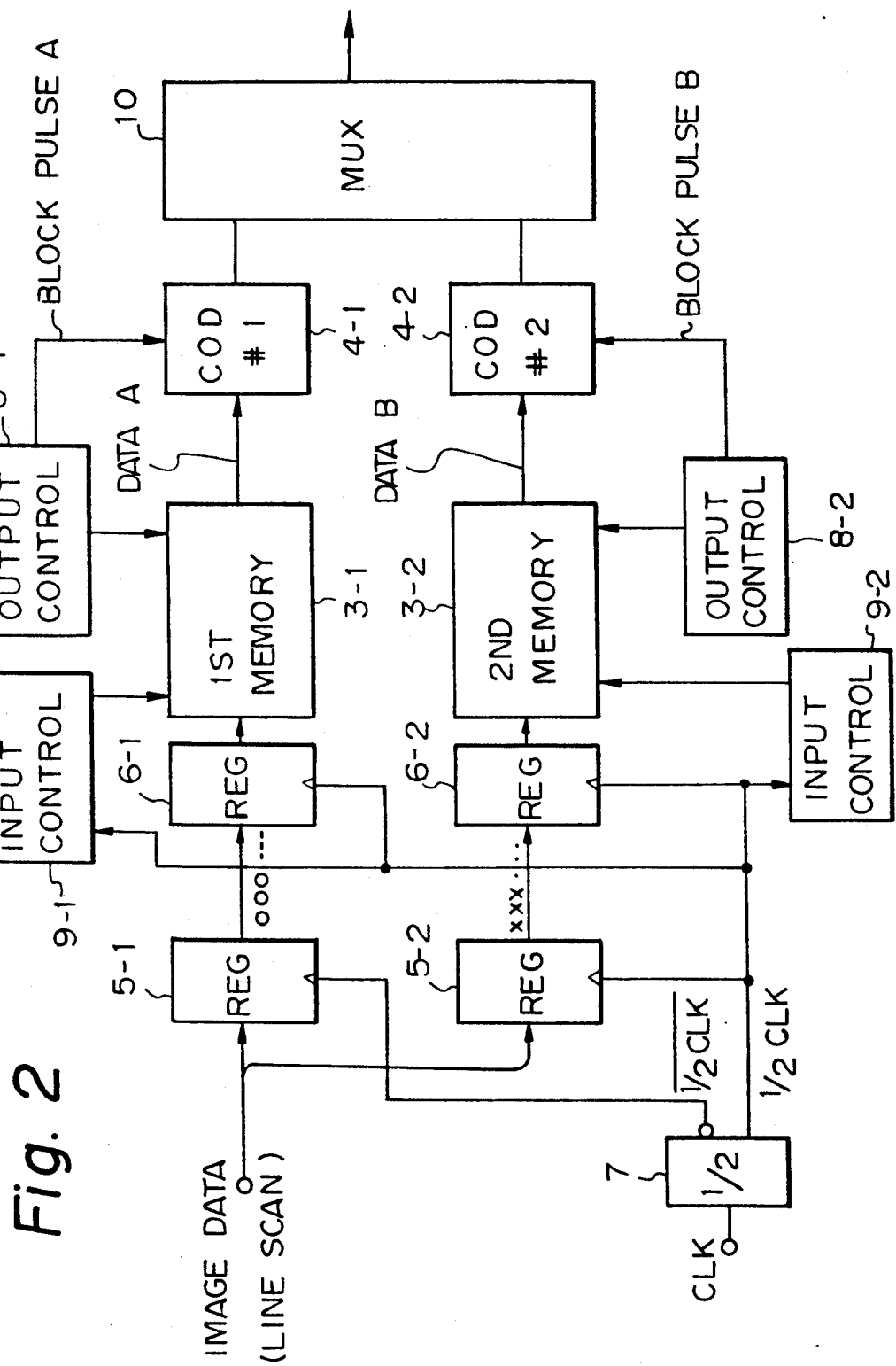
FIG. 2 shows the construction of the coding system in the embodiment of the present invention.

FIG. 2 shows the construction of the coding system in the embodiment of the present invention.

In FIG. 2, reference numerals 3-1 and 3-2 respectively denote first and second memories, 4-1 and 4-2 each denote first and second coders, 5-1, 5-2, 6-1, and 6-2 each denote a register, 7 denotes a frequency dividing circuit, 8-1 and 8-2 each denote an output control circuit, 9-1 and 9-2 each denote an input control circuit, and 10 denotes a mutiplexer.

Figure 3:
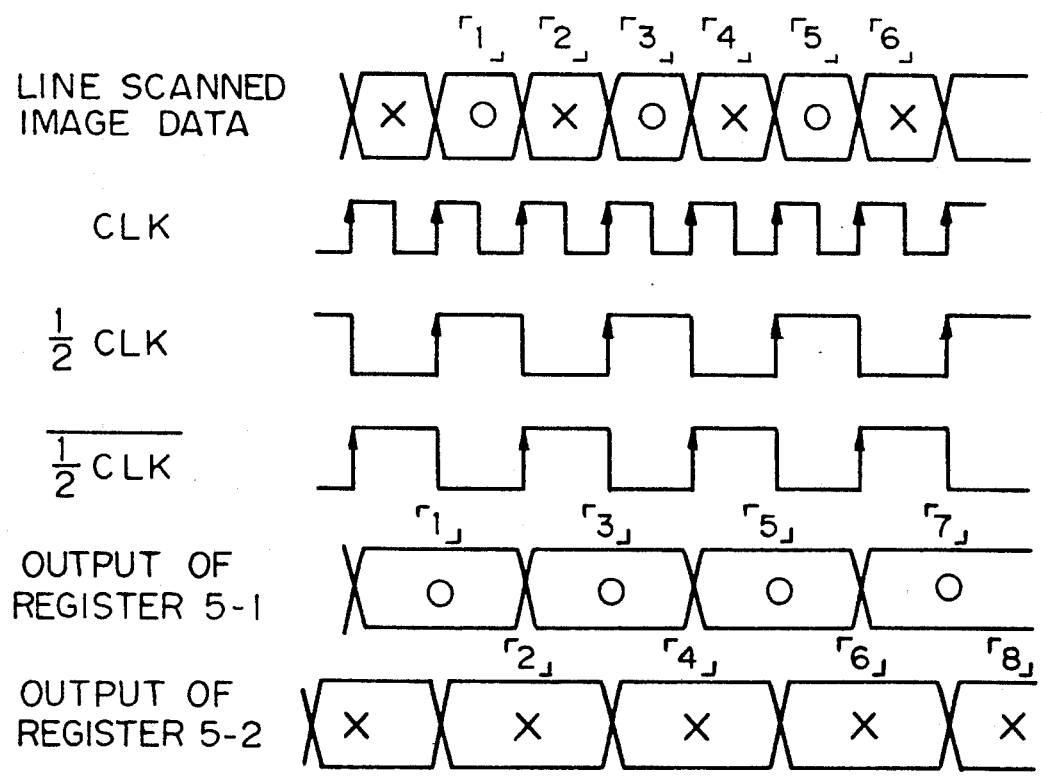
FIG. 3 shows an example of timing of the operation of the construction of FIG. 2.

Line scanned image data is serially supplied to the registers 5-1 and 5-2. The frequency dividing circuit 7 divides a frequency of a clock signal CLK, and outputs two frequency divided clock signals $\frac{1}{2}$CLK and $\frac{1}{2}$CLK, where the phase of one of the frequency divided clock signals differs from the other by a cycle of the above clock CLK. The frequency divided clock signal $\frac{1}{2}$CLK is supplied to the register 5-1 to give a data input timing to the register 5-1, and the other frequency divided clock signal $\frac{1}{2}$CLK is supplied to the register 5-2 to give a data input timing to the register 5-2. The above line scanning is carried out synchronized with the clock CLK, and data of each pixel in the line scanned image data is alternatively input into the registers 5-1 and 5-2. An example of timing of the above operation is shown in FIG. 3.

Figure 1A:
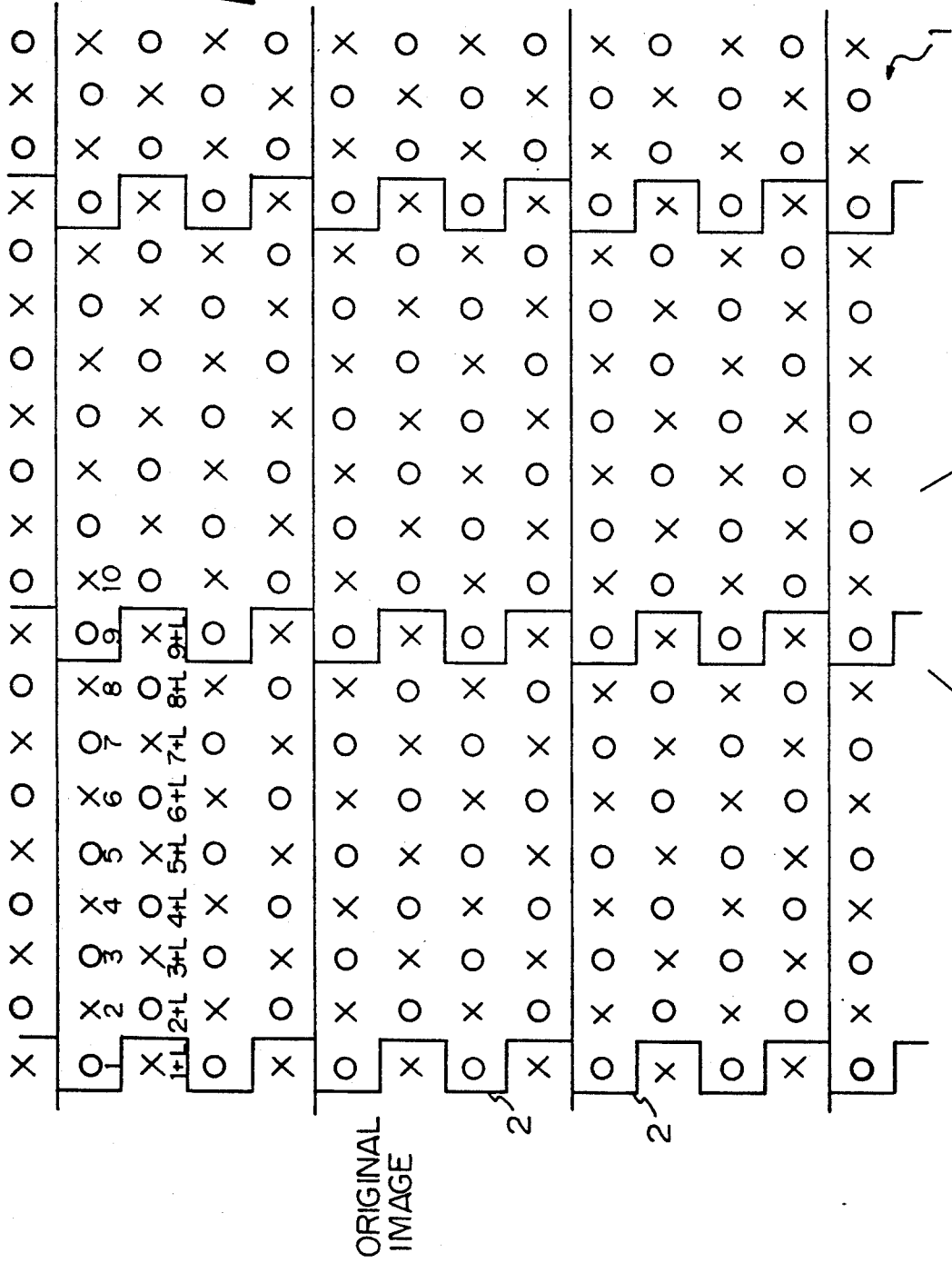
Figure 1B:
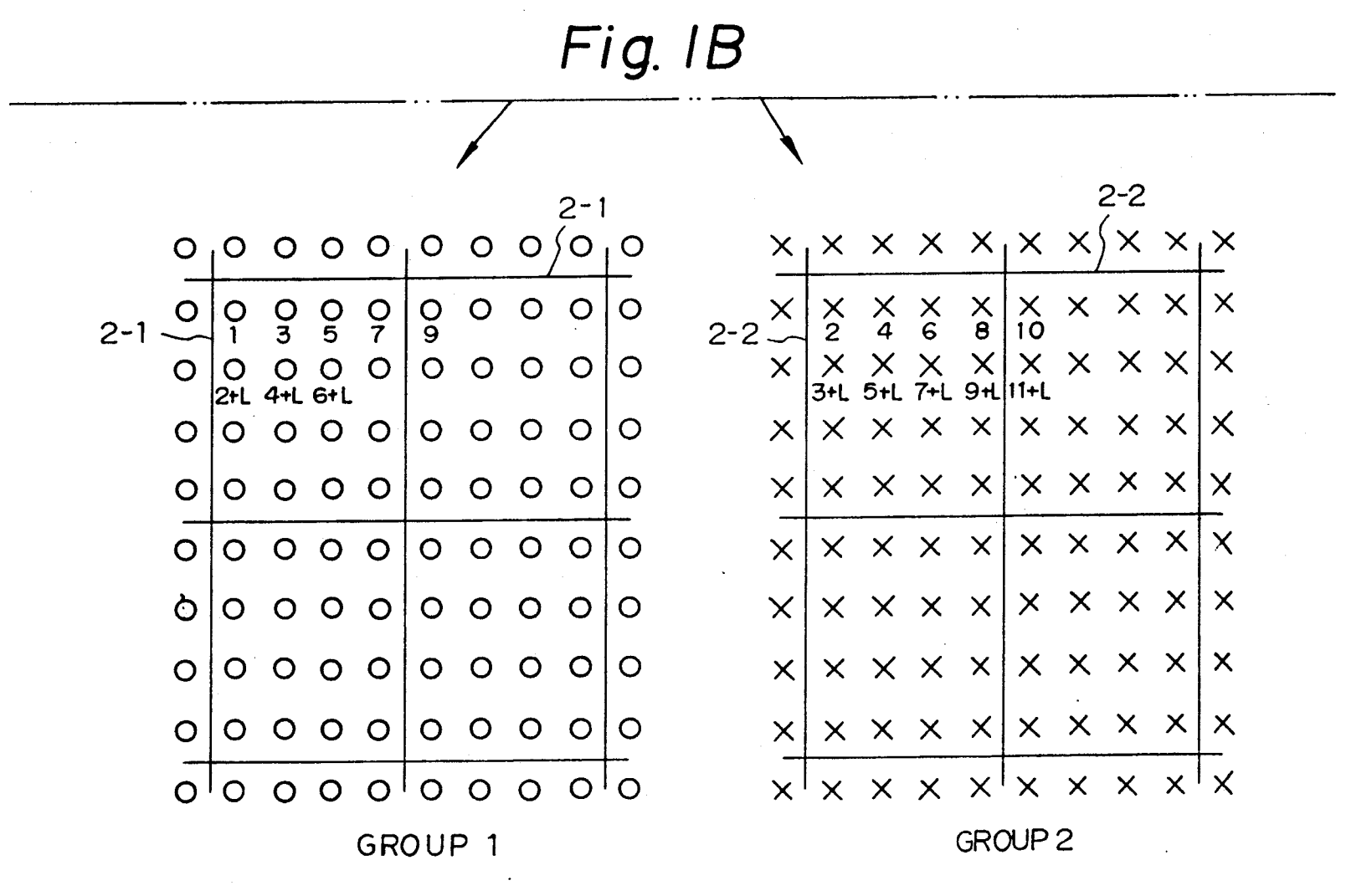

The frequency divided clock signals $\frac{1}{2}$CLK is also supplied to the registers 6-1 and 6-2 to give a data input timing to the registers 6-1 and 6-2. Thus, the outputs of the registers 5-1 and 5-2 are respectively input into the registers 6-1 and 6-2, and then are respectively input into the first and second memories under the control of the input control circuits 9-1 and 9-2. Thus, the aforementioned group 1 data (shown in FIG. 1) is selectively input into the first memory 3-1, and the aforementioned group 2 data (shown in FIG. 1) is selectively input into the second memory 3-12.

The image data stored in the first and second memories 3-1 and 3-2 are respectively supplied to the first and second coders 4-1 and 4-2 block by block under the control of the output control circuits 8-1 and 8-2. The output control circuit 8-1 supplies addresses for outputting data of pixels from the first memory 3-1 to the first coder 4-1, and a block pulse A, and the output control circuit 8-2 supplies addresses for outputting data of pixels from the first memory 3-2 to the first coder 4-2, and a block pulse B.

Figure 4:
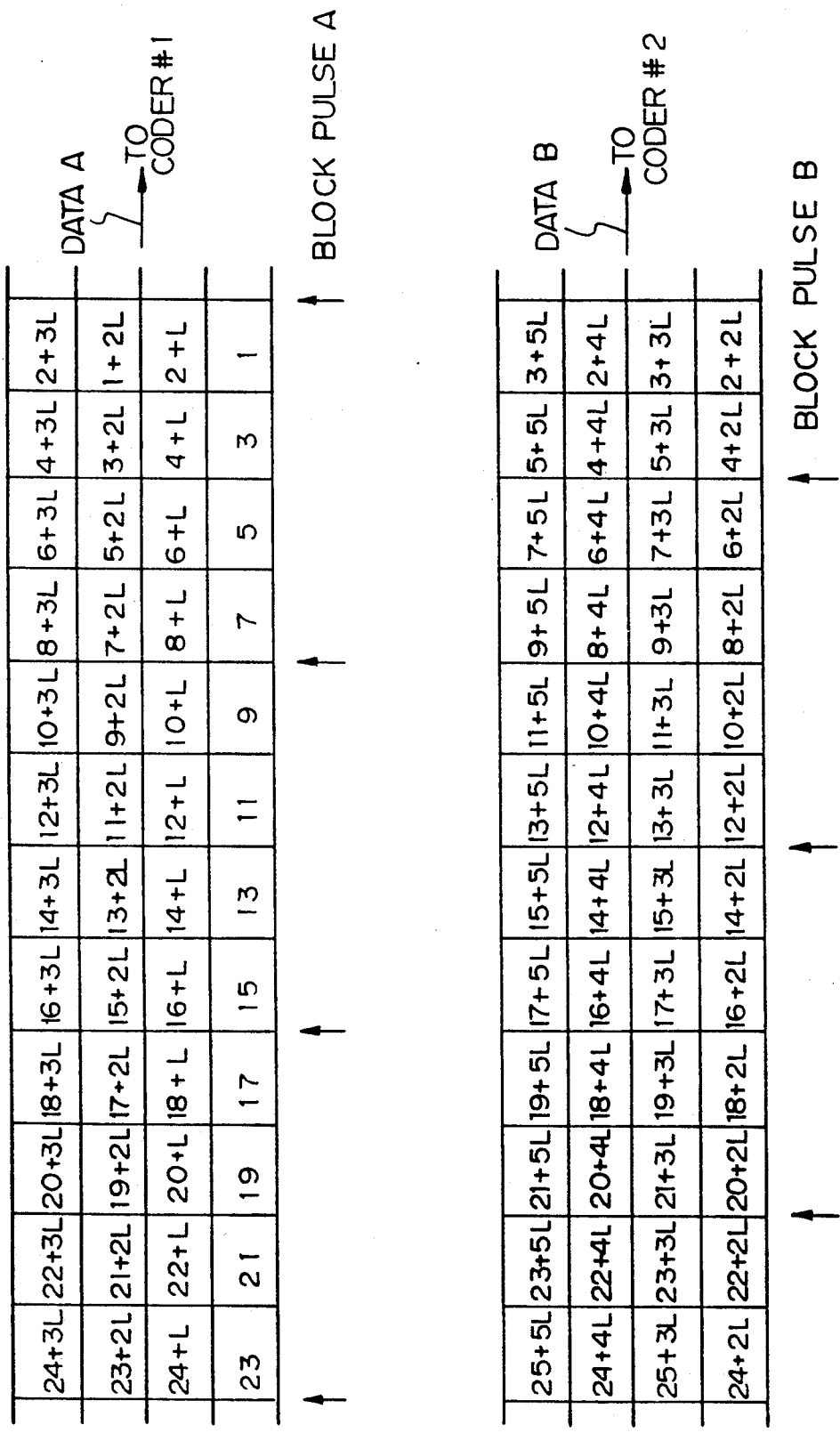
FIG. 4 shows the orders of pixels which are output from the first memory 3-1 to the first coder 4-1, and the orders of pixels which are output from the second memory 3-2 to the second coder 4-2.

The orders of pixels which are output from the first memory 3-1 to the first coder 4-1, and the orders of pixels which are output from the second memory 3-2 to the second coder 4-2, are shown in FIG. 4, together with the timing of the block pulses A and B. In FIG. 4, 1, 2, 3, 4, 5, 6, . . . each denote data of each pixel in a (first) line in the original bit map data, 1+L, 2+L, 3+L, 4+L, 5+L, 6+L, . . . each denote data of each pixel in the next (second) line, 1+2L, 2+2L, 3+2L, 4+2L, 5+2L, 6+2L, . . . each denote data of each pixel in the next (third) line, and the like. The timing of the block pulses A and B are respectively shown by arrows. The block pulses A and B are respectively supplied to the first and second coders 4-1 and 4-2 to indicate the boundaries between blocks in the data which supplied from the first and second memories 3-1 and 3-2 to the first and second coders 4-1 and 4-2, respectively, and the aforementioned block transformation coding is carried out in each coder.

Figures 5, 5A, 5B:
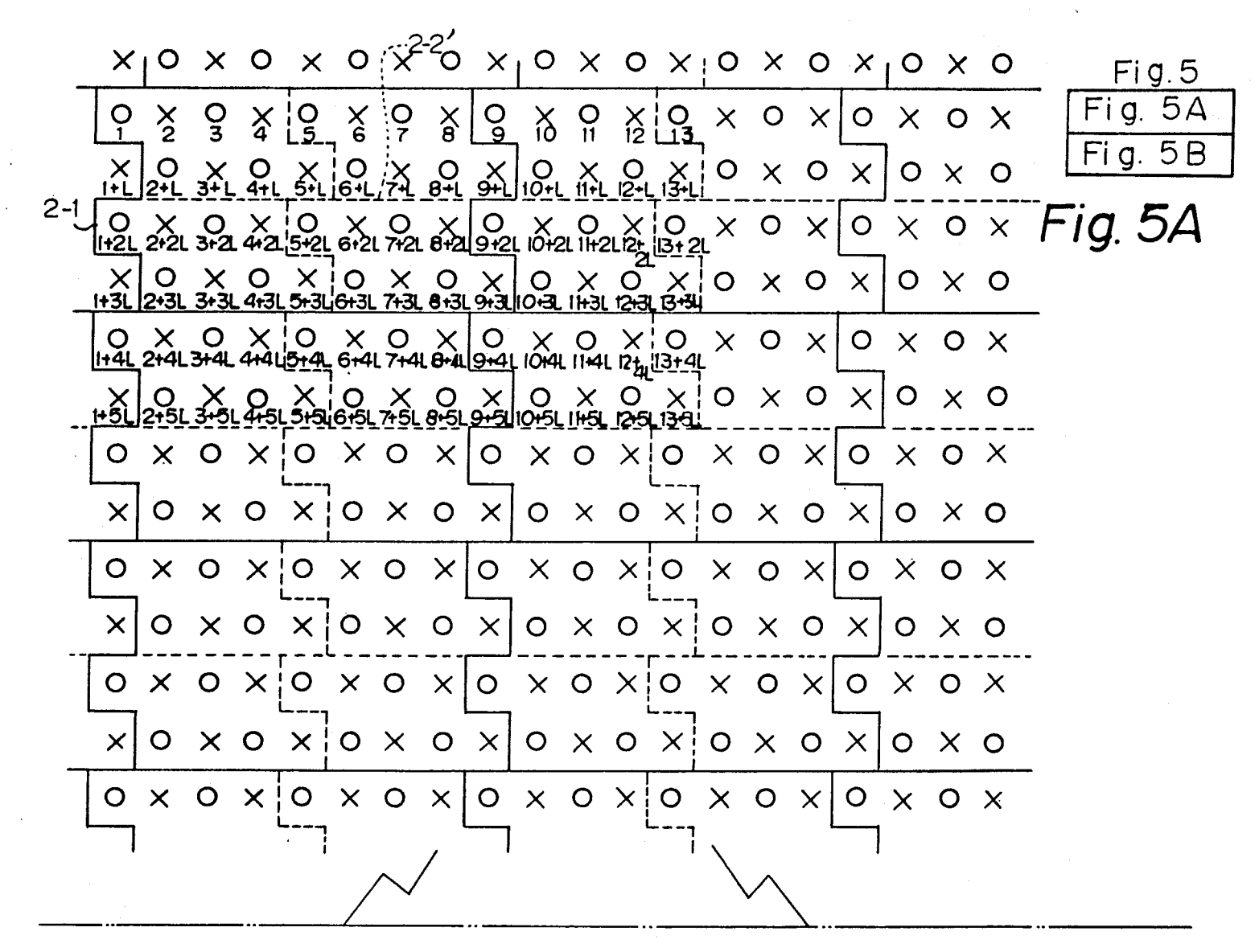
Figure 5B:
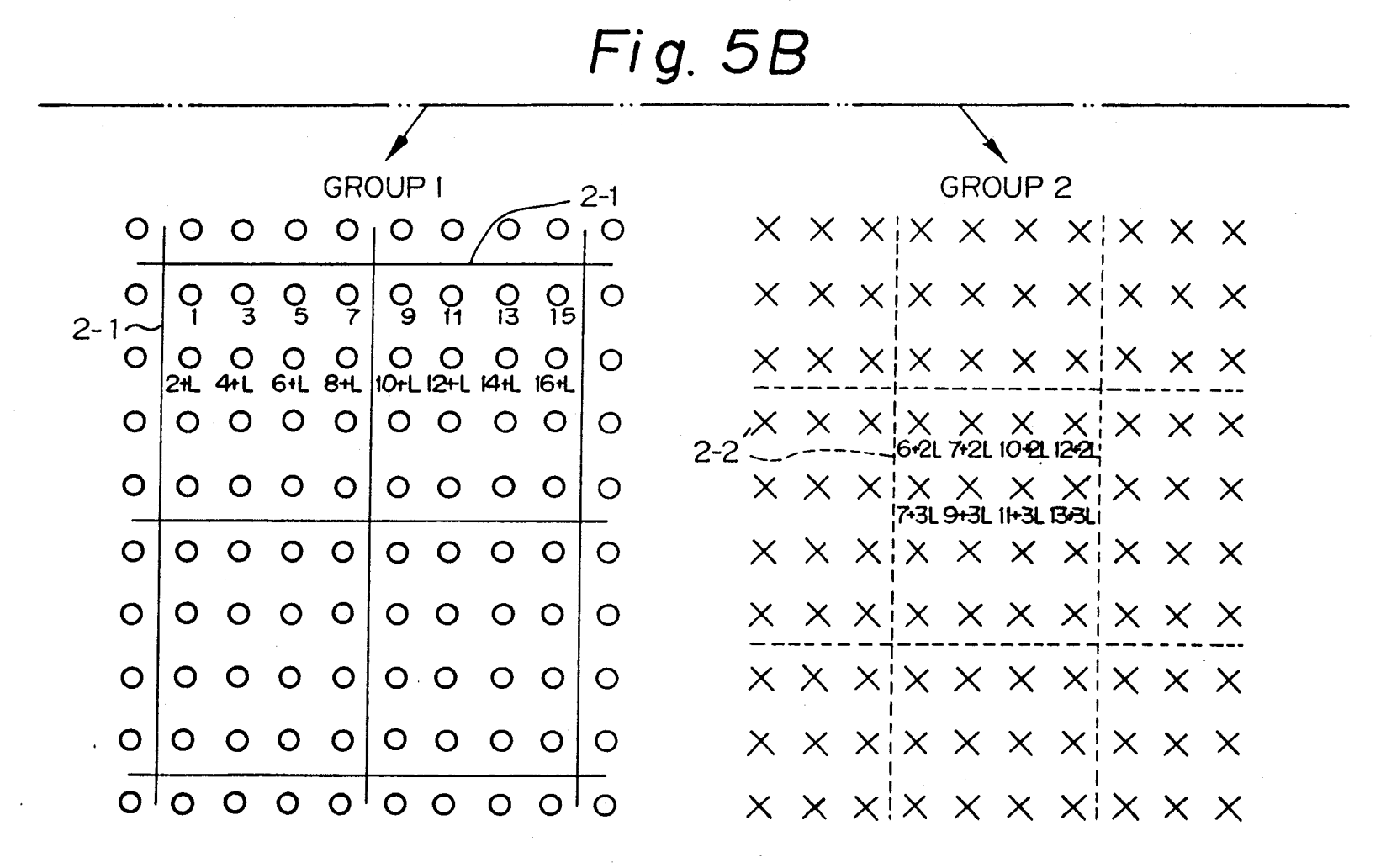

The locations of the above (boundaries of) the blocks in the embodiment of the present invention, are shown in FIGS. 5, 5A and 5B. In FIGS. 5A and 5B, each of pixels whose data is input through the first memory 3-1 to the first coder 4-1 is indicated by O, each of pixels whose data is input through the second memory 3-2 to the second coder 4-2 is indicated by X, the boundaries of the blocks of the data which is supplied to the first coder 4-1 are shown by bold lines, and the boundaries of the blocks of the data which is supplied to the second coder 4-2 are shown by bold dashed lines.

In the construction of FIG. 2, the outputs of the first and second coders 4-1 and 4-2 are multiplexed in the multiplexer 10, and then are transmitted to a receiver side.

Figure 6:
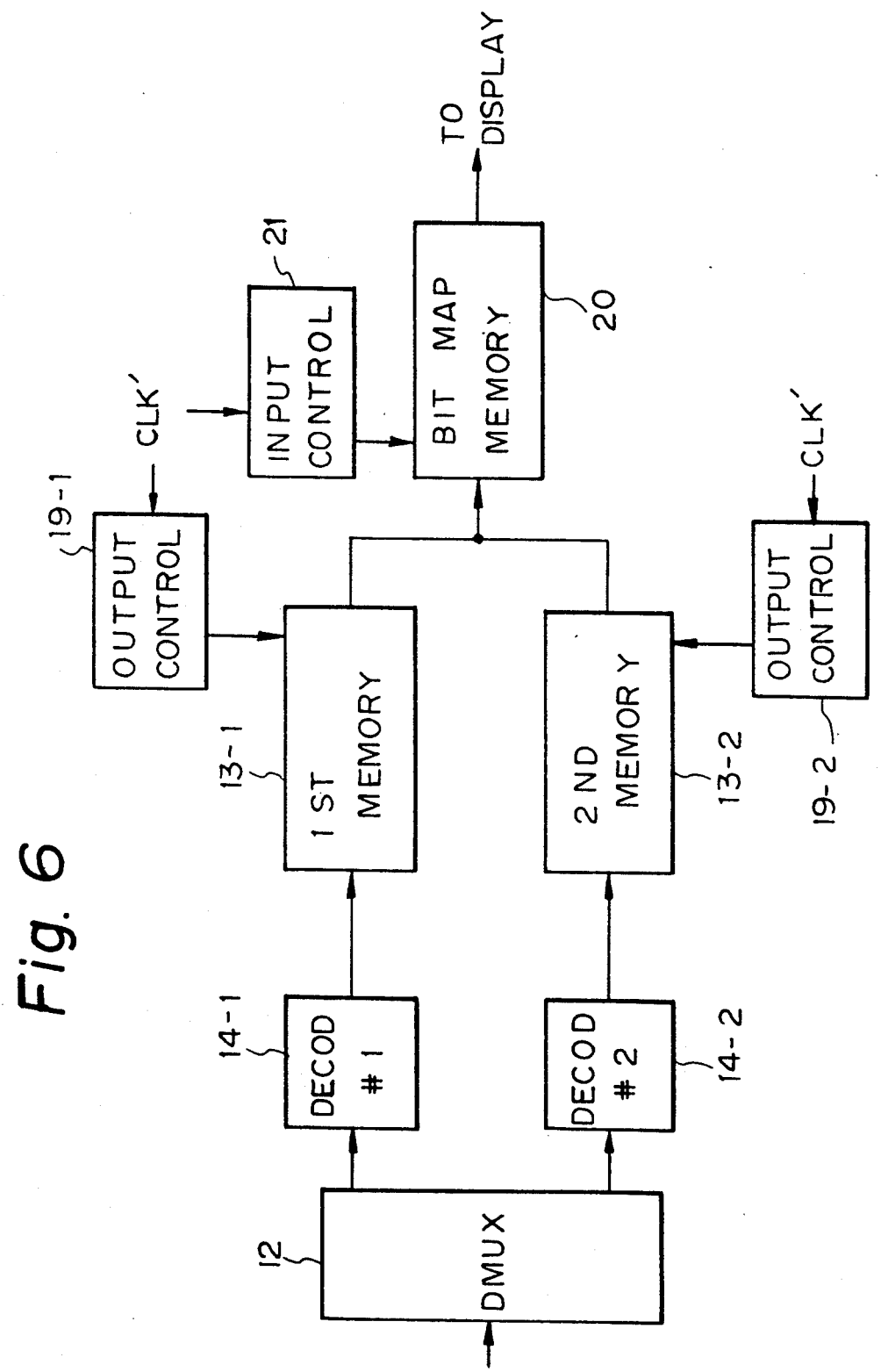
FIG. 6 shows a construction of a decoder system for receiving and decoding the above multiplexed data, and restoring the original image data.

FIG. 6 shows a construction of a decoder system for receiving and decoding the above multiplexed data, and restoring the original image data.

In FIG. 6, reference numeral 12 denotes a demultiplexer, 13-1 and 13-2 respectively denote first and second memories, 14-1 and 14-2 each denote first and second decoders, 19-1 and 19-2 each denote an output control circuit of the first and second memories 13-1 and 13-2, 21 denotes an input control circuit, and 20 denotes a bit map memory for storing restored image data.

In the demultiplexer 12, the above multiplexed image data is demultiplexed into the coded image data in the group 1 and the coded image data in the group 2, corresponding to the outputs of the first and second coders 4-1 and 4-2, respectively. Then, the coded data in the group 1 is decoded in the first decoder 14-1, and the coded data in the group 2 is decoded in the second decoder 14-2. The outputs of the first and second decoders 14-1 and 14-2 correspond to the image data of the groups 1 and the group 2 as shown in FIGS. 5A and 5B, respectively, and are stored in the first and second memories 13-1 and 13-2, respectively.

The output control circuits 19-1 and 19-2 respectively control the output operations of the first and second memories 13-1 and 13-2 synchronized with a clock CLK' in the receiver side, and the input control circuit 21 controls the input operation of the bit map memory 20 synchronized with the clock CLK'. The control operations by the output control circuits 19-1 and 19-2 and the input control circuit 21, are carried out so that the group 1 data and the group 2 data (as shown in FIGS. 5A and 5B) are composed to restore the original image data as shown in FIGS. 5A and 5B, i.e., data of pixels each indicated by O is transferred from the first memory 13-1 to the bit map memory 20, and data of pixels each indicated by X is transferred from the first memory 13-1 to the bit map memory 20, by reading the data of pixels which are stored in the addresses shown as "GROUP 1" or "GROUP 2" in FIGS. 5A and 5B from the first and second memories 13-1 and 13-2, and writing the data in the addresses shown as "ORIGINAL DATA" in FIGS. 5A and 5B. Thus, the original image data is restored in the bit map memory 20 to display the image on a display device.

As shown in FIGS. 5A and 5B, the boundaries of the blocks of image data in the group 1 are located in different positions from the boundaries of the blocks of image data in the group 2; and the timing of the block pulse A is different from the timing of the block pulse B. In particular, in the embodiment, the boundaries of the blocks of image data in the group 1 are located in the middle of two of the boundaries of the blocks of image data in the group 2, respectively, in both the vertical and horizontal directions, and the timing of each block pulse A differs from the timing of a following block pulse B by half of a recurring cycle of the block pulses A and B, respectively. Therefore, the aforementioned blocklike pattern is not emphasized in the decoded image by the above parallel coding using two coders.

We claim:

1. An image data coding and decoding system for coding and decoding pixels in bit map frames comprising:
   an image data coder comprising:
     first block supply means for receiving a first group of pixels from the bit map frames and for dividing the first group into a plurality of first blocks along first boundaries, each first block containing a predetermined number of pixels;
     second block supply means for receiving a second group of pixels from the bit map frames, the second group being interlaced with the first group, and for dividing the second group into a plurality of second blocks along second boundaries chosen to be offset by a predetermined distance from the first boundaries, each second block containing the predetermined number of pixels;
     a first coder connected to receive and code the first blocks from said first block supply means by block transformation coding; and
     a second coder connected to receive and code the second blocks from said second block supply means by block transformation coding; and
   an image data decoding apparatus comprising:
     a first decoder operatively coupled to said first coder;
     a second decoder operatively coupled to second coder;
     bit map memory means for receiving first and second blocks from said first and second decoders and for storing the pixels from the first and second blocks to produce pixels in bit map frames;
     first block transfer means for transferring the first blocks from said first decoder to said bit map memory means; and
     second block transfer means for transferring the second blocks from said second decoder to said bit map memory means, the predetermined distance being determined such that a block like pattern is reduced in a decoded image constituted by the pixels in the bit map frames stored in said bit map memory means.

2. An image data coding apparatus for coding pixels in bit map frames comprising:
   first block supply means for receiving a first group of pixels from the bit map frames and for dividing the first group into a plurality of first blocks along first boundaries, each first block containing a predetermined number of pixels;
   second block supply means for receiving a second group of pixels from the bit map frames, the second group being interlaced with the first group, and for dividing the second group into a plurality of second blocks along second boundaries chosen to be offset by a predetermined distance from the first boundaries, each second block containing the predetermined number of pixels, the predetermined distance being determined such that a block like pattern is reduced when the image is decoded;
   a first coder connected to receive and code the first blocks from said first block supply means by block transformation coding; and
   a second coder connected to receive and code the second blocks from said second block supply means by block transformation coding.

3. An image data coding apparatus according to claim 2,
   wherein said first block supply means comprises first data memory means for receiving the pixels from the bit map frames in an order of line scanning and for temporarily holding a first part of the pixels; and
   wherein said second block supply means comprises second data memory means for receiving the pixels from the bit map frames in an order of line scanning and for temporarily holding a second part of the pixels.

4. An image data coding apparatus according to claim 3, wherein each of said first and second block supply means comprises:
   address generating means for generating addresses of pixels in each of said blocks and for reading the pixels from a corresponding one of said first and second data memory means; and
   block timing generating means for generating a timing signal which indicates a start time for each block and for supplying the timing signal to a corresponding one of said first and second coders, wherein the addresses and the timing signal are determined such that the first boundaries of the first blocks are offset by a predetermined distance from the second boundaries of the second blocks.

5. An image data coding apparatus according to claim 3, wherein each pixel of the bit map frames, which is received in a line scanning order, is alternatively received by said first and second data memory means as a component of said first and second groups, respectively.

6. An image data coding apparatus according to claim 2, further comprising a multiplexer connected to said first and second coders.

7. The image data coding apparatus according to claim 2, further comprising an image data decoding apparatus comprising:
   a first decoder operatively coupled to said first coder;
   bit map memory means for receiving first and second blocks from said first and second decoders and for storing the pixels from the first and second blocks to produce pixels in bit map frames;
   first block transfer means for transferring the first blocks from said first decoder to said bit map memory means; and
   second block transfer means for transferring the second blocks from said second decoder to said bit map memory means.

8. An image data decoding apparatus for decoding coded data to provide pixels in bit map frames comprising:

a first decoder connected to receive the coded data and provide a plurality of first blocks, each of the first blocks defined by first boundaries dividing a first group of the pixels so that each of the first blocks contain a predetermined number of pixels;

a second decoder connected to receive the coded data and provide a plurality of second blocks, each of the second blocks defined by second boundaries dividing a second group of the pixels so that each of the second blocks contains the predetermined number of pixels, the second group being interlaced with the first group;

bit map memory means for receiving the first and second blocks from said first and second decoders and for storing the pixels from the first and second blocks to produce the pixels in the bit map frames;

first block transfer means for transferring the first blocks from said first decoder to said bit map memory means; and second block transfer means for transferring the second blocks from said second decoder to said bit map memory means so that the second boundaries dividing the second group of the pixels are offset by a predetermined distance from the first boundaries, the predetermined distance being determined such that a block like pattern is reduced in a decoded image constituted by the pixels in the bit map frames in said bit map memory means.

9. An image data decoding apparatus according to claim 8, wherein said first block transfer means comprises first data memory means for receiving the first blocks from said first decoder and for temporarily holding the first blocks therein; and wherein said second block transfer means comprises second data memory means for receiving the second blocks from said second decoder and for temporarily holding the second blocks therein.

10. An image data decoding apparatus according to claim 9, wherein each of said first and second block transfer means comprises:

reading address generating means for generating reading addresses for said first and second memory means to read pixels of the first and second blocks from said first and second memory means; and writing address generating means for generating writing addresses for said first and second memory means to write pixels of the first and second blocks in said bit map memory means, the reading and writing addresses determined such that said pixels read from said first and second memory means are stored so that the second boundaries are offset by a predetermined distance from the first boundaries.

11. An image data decoding apparatus according to claim 10, further comprising:

demultiplexer means for receiving a multiplexed signal and demultiplexing the multiplexed signal to provide the coded data to said first and second decoders.

* * * * *